Figure 1:
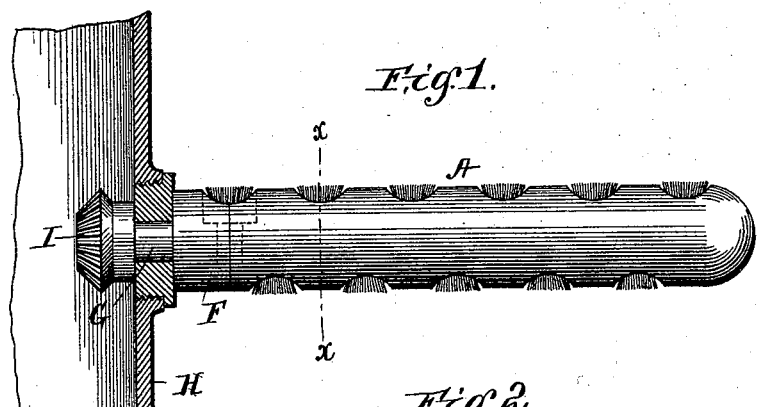

(No Model.) 2 Sheets—Sheet 1.

G. N. TODD.
PICKER STEM FOR COTTON HARVESTERS.

No. 497,462. Patented May 16, 1893.

Witnesses:

Inventor:
Geo. N. Todd
By Elliott & Oushundro
Attys.

(No Model.) 2 Sheets—Sheet 2.

G. N. TODD.
PICKER STEM FOR COTTON HARVESTERS.

No. 497,462. Patented May 16, 1893.

Witnesses:
Wm. M. Rheem.

Inventor:
Geo. N. Todd
By Elliott & Cushman
Attys

UNITED STATES PATENT OFFICE.

GEORGE N. TODD, OF CHICAGO, ILLINOIS, ASSIGNOR TO THE TODD COTTON HARVESTER COMPANY, OF SAME PLACE.

PICKER-STEM FOR COTTON-HARVESTERS.

SPECIFICATION forming part of Letters Patent No. 497,462, dated May 16, 1893.

Application filed December 29, 1891. Serial No. 416,449. (No model.)

*To all whom it may concern:*

Be it known that I, GEORGE N. TODD, a citizen of the United States, and a resident of Chicago, in the county of Cook and State of Illinois, have invented certain new and useful Improvements in Picker-Stems for Cotton-Harvesters, of which the following is a specification.

This invention relates to improvements upon picker stems in which, prior to this invention, the body of the picker stem has had formed therewith or attached thereto individual picker teeth, substantially rigid or non-elastic, or else elastic fibrous or bristle-like flexible material projecting from the surface of the stem and designed to engage the cotton when the stem is thrust into the plant. The main objection to the first mentioned construction of prior picker stems is the difficulty experienced in removing the gathered cotton therefrom, the hook-like form of the individual teeth rendering it almost impossible to remove the cotton, especially if the teeth are unguarded, as the cotton cannot be stripped therefrom by any of the ordinary cleaners working from end to end of the stems because they must necessarily work transversely to the length of the hook-like teeth by which the cotton is engaged, while on the other hand it is equally difficult to remove the cotton by a cleaner device working transversely of the stem but longitudinally of the teeth in the direction in which the teeth point, because in the act of gathering the cotton the stems are necessarily rotated upon their individual axes a number of times, generally six to eight times, and hence the fiber from each boll of cotton is generally wrapped several times around the stem. On the other hand the picking bristles of the other form are so held by the body of the stem that they are not, under all conditions, capable of being readily depressed below the surface of the body of the stem, and hence such bristles soon become so hopelessly entangled with the cotton that they cease to perform their function as pickers and also interfere with the removal of the cotton from the stem.

The prime object of this invention is to provide a picker stem with a picking surface of elastic material and of such a character that the cotton will not only be absolutely prevented from matting therein or thereon, but the cotton may be readily removed from the stem by almost any form of cleaner device, whether acting longitudinally of the stem as a stripper or transversely of the stem as a wiper.

Another object is to provide a picker stem with a universally yielding or flexible picking surface which will securely engage the fiber of the cotton without danger or liability of tearing or breaking the fibers, whereby bolls of which only a few fibers are within reach of the picker stems may be as easily engaged as if the main body of the boll were in direct contact therewith.

Other objects are to provide certain details in the carrying out of my invention, all as illustrated in the accompanying drawings in which—

Figure 2:
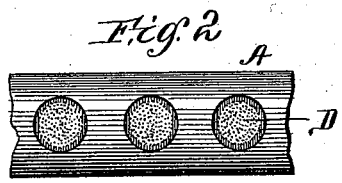
Figure 4:
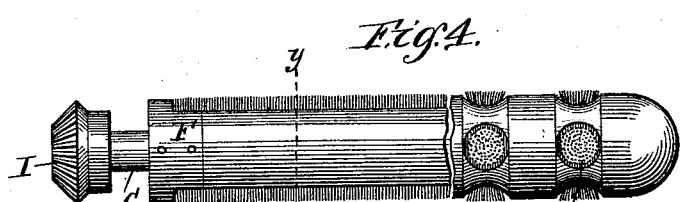
Figure 5:
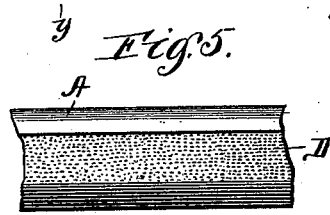
Figure 3:
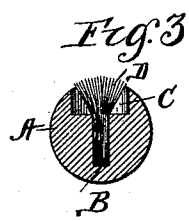
Figure 6:
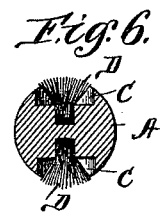

Figure 1 represents a side elevation of a picker stem embodying my invention; Fig. 2, a detail plan view thereof; Fig. 3, a cross section thereof on the line $x, x$, of Fig. 1; Fig. 4, a side elevation of a picker stem showing different arrangements of a picking surface; Fig. 5, a detail plan view thereof; Fig. 6, a cross section on the line $y, y$, of Fig. 4; and Figs. 7 to 15 inclusive, other modified forms of picker stems embodying my invention, which will be described in detail farther on.

Similar letters of reference indicate the same parts in the several figures of the drawings.

In carrying out my invention and as indicated in all the figures of the drawings, I employ a picker stem body of any suitable construction provided with openings, slots or chambers in which the bristles are secured and slightly from which the bristles project, the said openings or chambers at some point in the length of the bristles being larger than the cross-section of the bristles, that is to say such chambers are enlarged about the bristles; whereby the bristles will have room to buckle or bend in their openings or chambers and thus enable them to sink below the perimeter of the stem and release the cotton whether the cleaner employed acts as a stripper or a wiper. In some instances this enlargement of the slot or chamber in which the bristles are located, may be formed at the outer end or side thereof just where the ends of the bristles emerge, while in other instances such enlargement may be provided at a point farther inward nearer the inner ends of the bristles.

Referring by letter to Figs. 1 to 6 of the accompanying drawings, A indicates the main body of the stem, cylindrical in cross section, and preferably composed of wood, but may be of guttapercha, iron or any other suitable material, into which is bored a series of small holes or recesses B, extending partially through the body of the stem, preferably at right angles or radial to the axis thereof. These holes or recesses are counter-bored at their outer ends by the larger bores C, thus enlarging the outer end of the original bore at the periphery or perimeter of the stem, the walls of the counter-bored portion being either parallel with the walls of the original bore, as shown, or they may be at an angle thereto, so as to converge at the inner end thereof to meet the small bore. Into the latter is inserted a bunch of bristles D, or other suitable form of yielding or elastic material, which is secured in place by tarring or other adhesive material, by stitching, or in any other convenient or suitable manner, the outer free ends of said bristles standing uncompressed in the counterbore and projecting but a slight distance beyond the periphery or perimeter of the stem body. By such arrangement the outer ends of the bristles are free and unsupported laterally to a certain extent, although the body of the bristles is firmly secured to the stem. Hence when the stem is brought into contact with the cotton the bristles are free to give laterally and therefore will not tear through the fibers of the cotton as would rigid teeth, but on the contrary if only a few fibers were within reach of the bristles they would securely engage the fibers and as surely draw the entire boll of the cotton within reach of the stem without any liability of losing the cotton after once being engaged thereby.

The removal of the gathered cotton from the stems is rendered far more easy than by any of the prior constructions of picker stems, and the effectiveness of a cotton harvester in which such stems are employed is correspondingly promoted.

The material of which the picker surface is composed may vary considerably, for such substances as wire, bristles, filaments, tampico grass, sponge, excelsior or any suitable fibrous material may be employed instead of the usual bristles such as brushes are composed of and still be within the scope of my invention, the essential requisite of such substances being flexibility, so that they will present a brush like surface to the cotton. The arrangement of the flexible picking surface is likewise immaterial, for, as shown in the drawings, the constructions and arrangements by which the ends and objects of my invention may be obtained, are many, and I have only herein illustrated a few of such modified forms to illustrate the variation of which my invention is susceptible. For instance, as shown in Figs. 1, 2 and 3, the bunches of bristles or other like material may be placed at intervals over the body of the stem, longitudinally thereof, or circumferentially thereof, as illustrated at the right in Fig. 4, or the bristles may be arranged in continuous strips, either longitudinally, transversely or spirally of the stem, as illustrated in Fig. 4, and the other figures of the drawings, so long as the flexible picking surface is guarded against the matting down of the cotton into such surface. Neither is it necessary to countersink the entire body of the flexible or bristle like teeth into the body of the stem in order to provide the teeth with guards, for as I have shown in Fig. 7, the bristles may be set in the usual manner of forming cylindrical brushes with the bristles projecting radially therefrom, and the guards E, of separate pieces be afterward secured to the body of the stem. Such a construction in fact produces a sectional stem and practically enlarges the main body A, thereof, to which the bristles are secured, to the diameter which would be required of the body were the guards not employed. The openings C', between the guards correspond with, and perform the same function as the counterbores C, of the construction shown in Figs. 1 to 6, and therefore serve the same purpose as the enlargement of the holes in the main body of the stem in which the bristles are secured. In the forms thus described it will be seen that the openings in which the bristles are situated are larger than the cross-section of such bristles throughout the entire length of the free ends thereof, thereby permitting absolute freedom of movement of the bristles in all directions.

Figure 8:
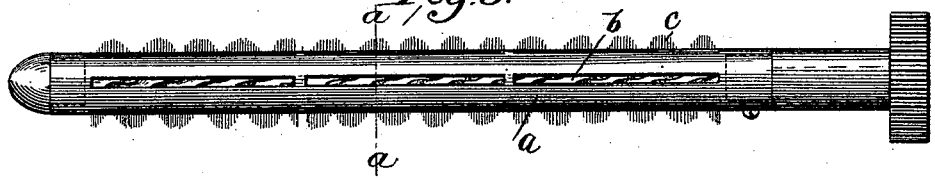
Figure 9:
Figure 10:

In Figs. 8, 9 and 10 I have shown still another form of stem embodying my invention, in which the body thereof is composed of a metallic tube $a$, provided with longitudinal or otherwise disposed slots $b$, or other shaped openings, through which project the bristles $c$, secured between the twisted wires $d$, extending centrally through the tube as more clearly illustrated in Fig. 10, which is a transverse vertical section taken on the line $a$, $a$, Fig. 8. In such a construction, while the bristles are not secured in holes in the stem having enlarged outer ends, still they are secured to the stem at a point within the perimeter of the stem, project slightly beyond the body thereof, and emerge from openings or recesses, which at the perimeter or body are somewhat larger than the compressed area of the brushes. In this form the open interior of the tube or shell constitutes the aforesaid enlargement to permit bending of the bristles, but in this instance such enlargement is situated near the inner ends of the bristles.

Figure 11:
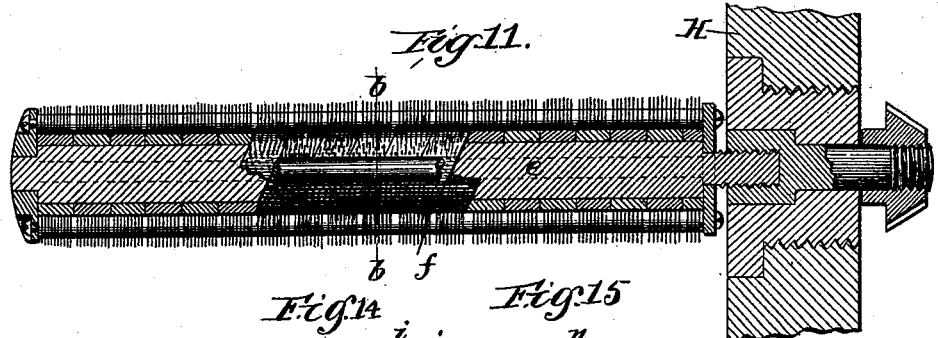
Figures 12, 14, 15:
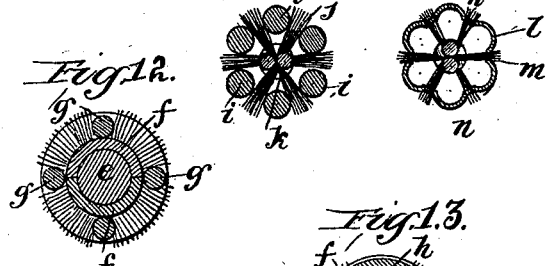

In Figs. 11 and 12, I have shown a central body portion e, preferably of wood, upon which is wrapped a strap of card clothing f, either spirally as shown, or otherwise, and embedded in the brush like surface of teeth thereof, are a number of longitudinally arranged rods g, the outer surfaces of which lie just within the outer line of the teeth, so that in effect the rods g, constitute the guards for the elastic or yielding picking teeth which lie in the openings between the rods as more clearly shown in Fig. 12, which is a transverse vertical section taken on the line b, b, of Fig. 11. This construction also possesses all the essentials of the constructions previously described, that is, bristles or brushes secured to the stem body, projecting slightly beyond the perimeter thereof, and emerging from openings or recesses, which at the perimeter of said stem or body are somewhat larger than the cross section of the brushes.

Figure 7:
Figure 13:
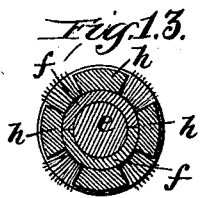

In Fig. 13, is illustrated the substitution of guards h, similar to the guards E, illustrated in Fig. 7, instead of the rods g, shown in Fig. 12, the edges of the rods h forming flaring grooves or openings which are larger at their outer sides than the cross-section of the bristles.

In Fig. 14, I have shown a circular series of rods i, substituted for the tubular body a, shown in Figs. 8, 9 and 10, the rods being placed parallel and a short distance apart to permit the bristles j, to project out between them from the twisted wires k, located centrally within the circular series of rods i, and to which the bristles are secured. These rods of course constitute a slotted tube or shell for all intents and purposes. In this instance the openings in which the bristles are located are enlarged both at the outer and inner ends of the bristles.

In Fig. 15, I have shown a modification of the structure shown in Figs. 8, 9 and 10, in which the tubular body is corrugated longitudinally as shown at l, and the openings m, through which the bristles project, are located in the depressions between the corrugations. This stem possesses the advantage over the others of permitting more exposure or projection of the stems beyond the openings therein, without going beyond the perimeter of the stem, and therefore furnishes more picking surface and permits more freedom of action for the bristles. In this instance the corrugations or ribs l, subserve the purposes of guards for the brush like teeth, which may be secured within the body of the stem, either to the twisted wires n, as shown, or in any other suitable manner. In this instance the corrugations are the equivalent of the outer surfaces of the round rods or bars i. This form also, has the enlargement near the inner ends of the bristles.

In the practical use of my picker stem, it is provided with some suitable form of journal and driving gear by which it may be rotated, such for instance as the metallic end cap F, to which the stem is secured, said cap having cast therewith, or otherwise secured thereto, a short shank or bearing portion G, upon which it is journaled in a suitable rotatable support H, as illustrated in Fig. 1, and a gear I, on the end thereof on the opposite side of the support from the stem, by means of which an axial rotation may be imparted to the stem as usual in cotton harvesters.

Having described my invention, what I claim, and desire to secure by Letters Patent, is—

1. A picker stem provided with brushes or bristles arranged within openings or chambers which are enlarged about the brushes or bristles, substantially as set forth.

2. In a cotton harvester, the combination with a picker stem support, of tubular picker stems journaled at one end therein having openings therein, and bristles projecting slightly through said openings and secured to an internal support, substantially as described.

3. In a cotton harvester, the combination with a picker stem support, of tubular picker stems journaled at one end therein and provided with openings, of a twisted wire located internally in said stems and bristles secured between the twists in said wire, the free ends of which project through the openings in said tubular stems, substantially as described.

GEORGE N. TODD.

Witnesses:
R. C. OMOHUNDRO,
W. R. OMOHUNDRO.